July 21, 1936.   H. D. STEVENS   2,048,361
SKIVING APPARATUS
Filed June 7, 1935   6 Sheets-Sheet 1

INVENTOR
Horace D. Stevens
BY
Albert L. Ely
ATTORNEY

July 21, 1936.　　H. D. STEVENS　　2,048,361
SKIVING APPARATUS
Filed June 7, 1935　　6 Sheets-Sheet 2

INVENTOR
Horace D. Stevens
ATTORNEY

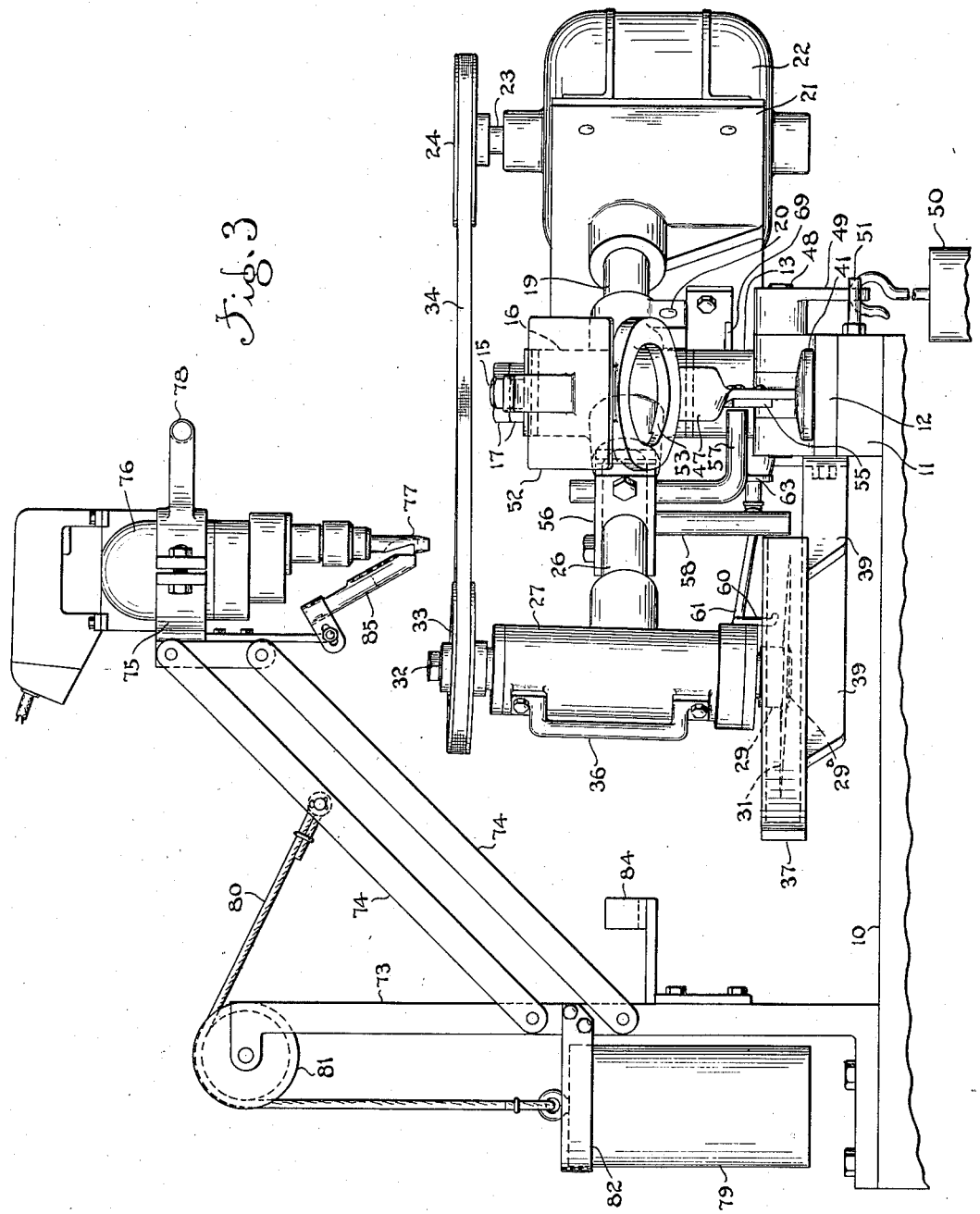

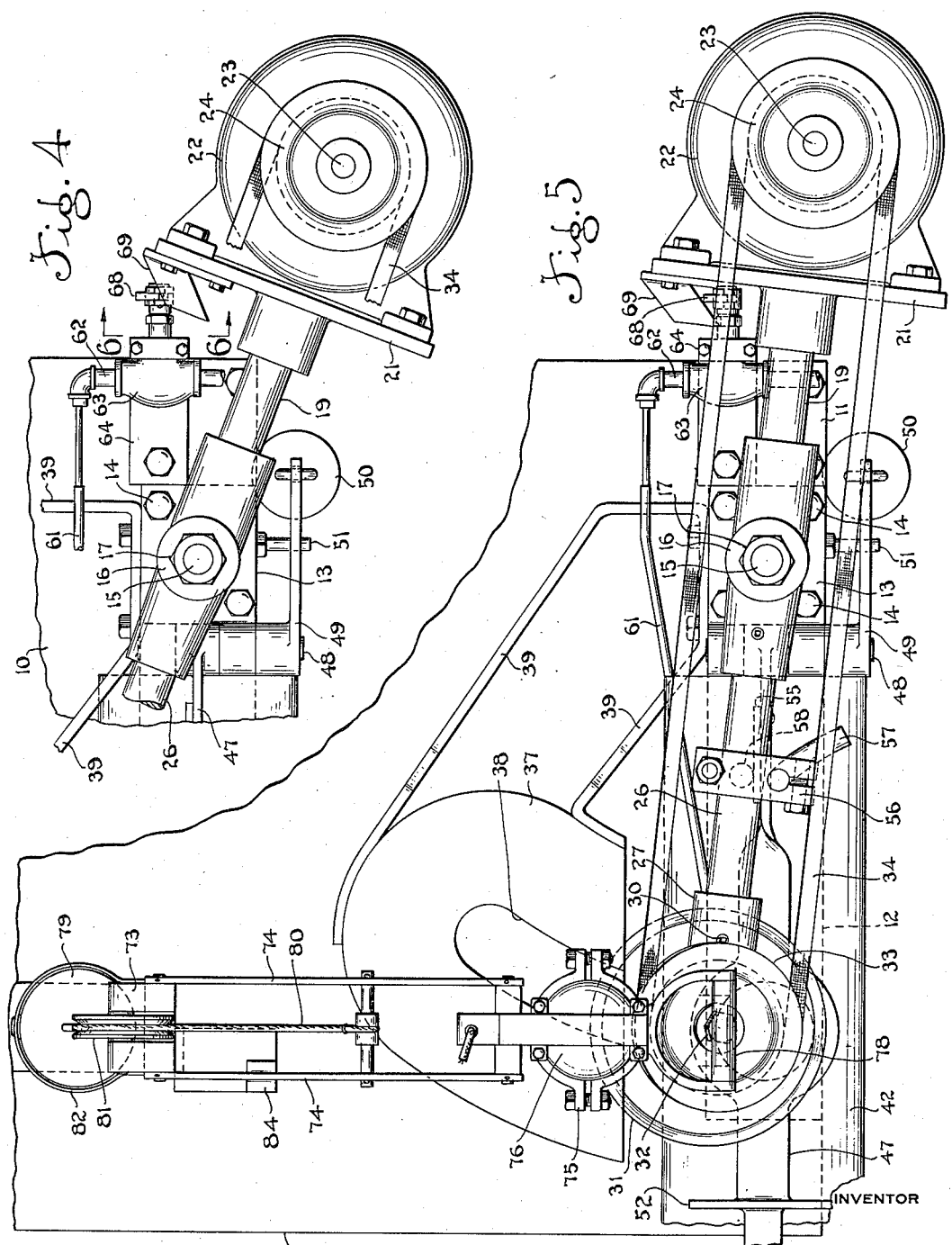

July 21, 1936.   H. D. STEVENS   2,048,361
SKIVING APPARATUS
Filed June 7, 1935   6 Sheets-Sheet 5
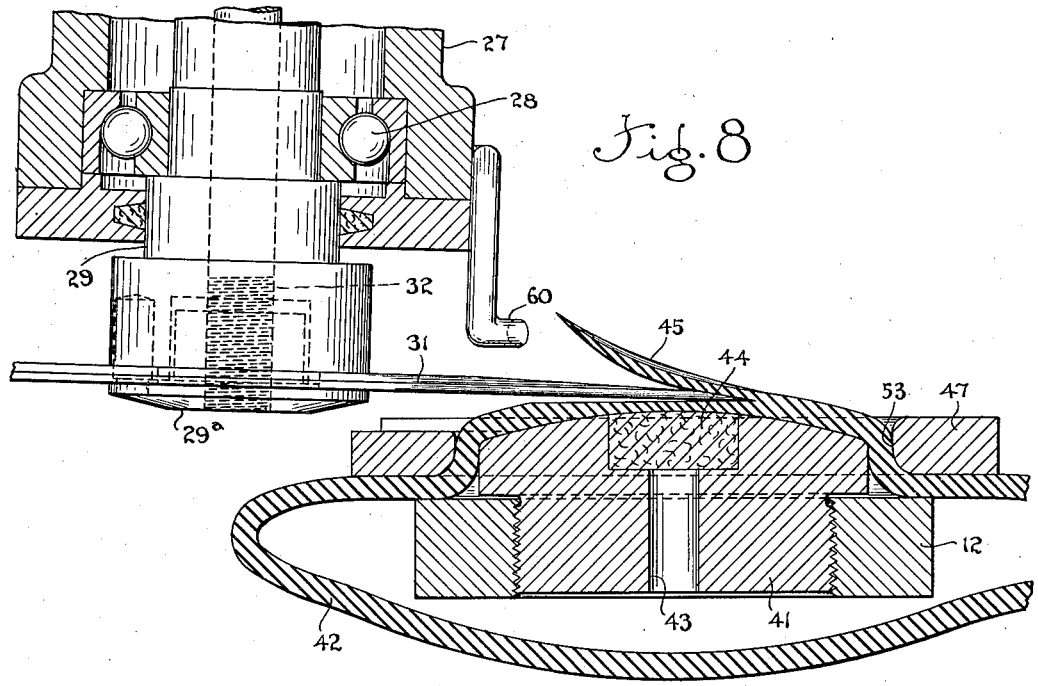
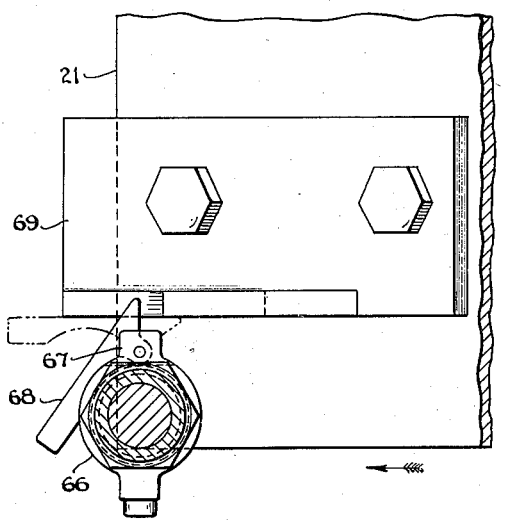 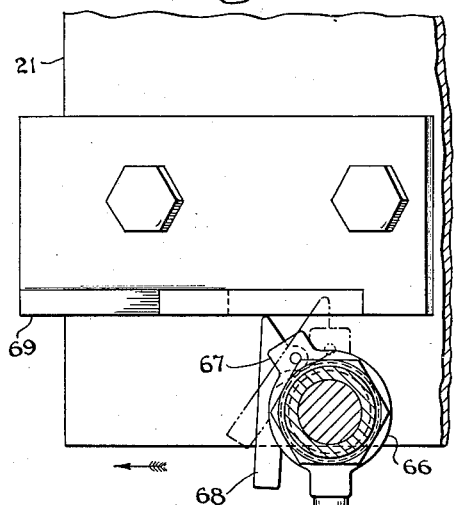
INVENTOR
Horace D. Stevens
BY
ATTORNEY July 21, 1936.  H. D. STEVENS  2,048,361
SKIVING APPARATUS
Filed June 7, 1935  6 Sheets-Sheet 6
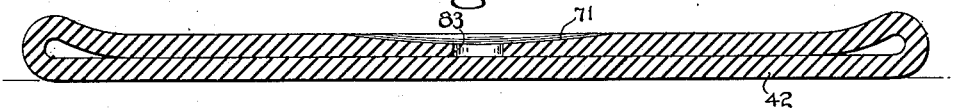
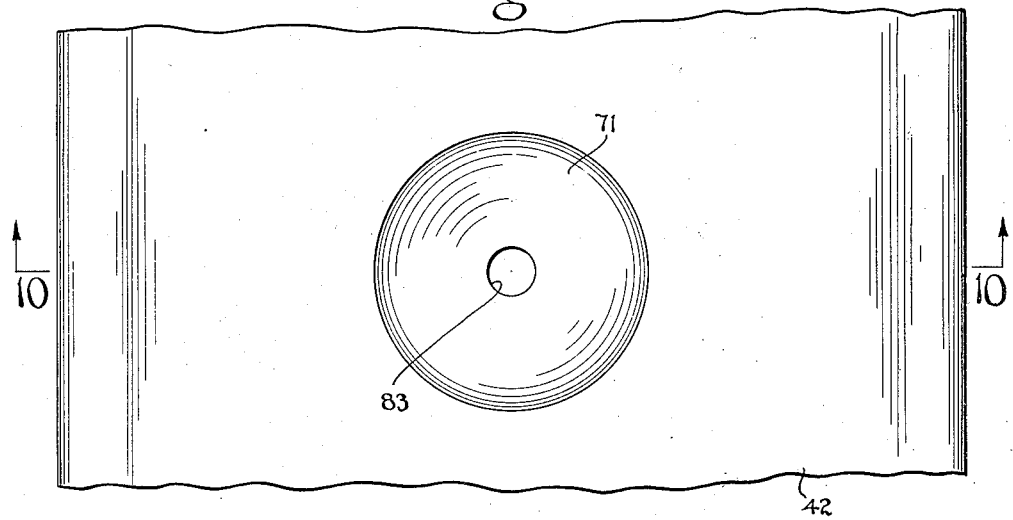
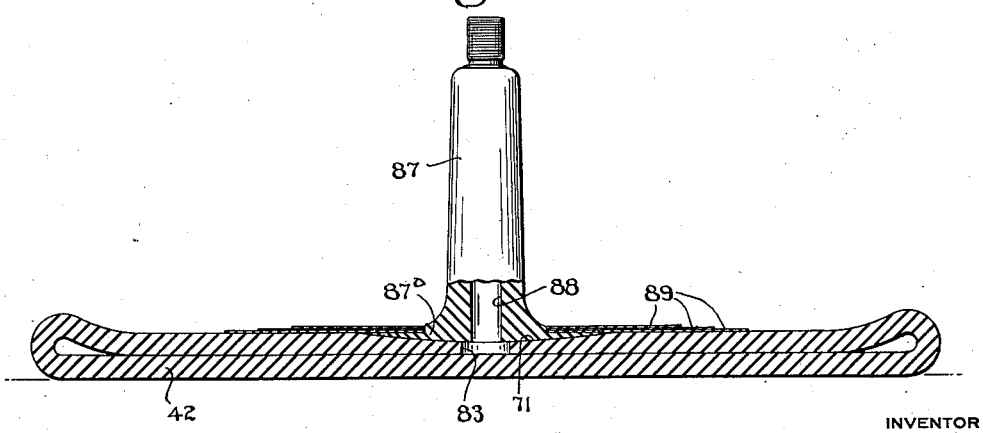
INVENTOR
Horace D. Stevens
BY
ATTORNEY Patented July 21, 1936

2,048,361

UNITED STATES PATENT OFFICE 2,048,361

SKIVING APPARATUS

Horace D. Stevens, Akron, Ohio, assignor to The Firestone Tire & Rubber Company, Akron, Ohio, a corporation of Ohio Application June 7, 1935, Serial No. 25,416

8 Claims. (Cl. 164—68)

This invention relates to skiving methods and apparatus, and more especially it relates to procedure and apparatus for forming a dimple or concavity in the surface of a structure composed of flexible material.

The illustrative embodiment of the invention shown and described herein constitutes an advantageous application of the invention to the manufacture of inner tubes for pneumatic tires, wherein it is utilized for removing a localized surface layer of the wall of an inner tube to form a concavity of determinate profile and depth therein. Said concavity subsequently receives the complementally shaped rubber base-flange of a valve stem used for inflating and deflating the finished inner tube. In the drawings is shown a perforating device that normally is associated with the skiving apparatus, although not a part of the invention.

The chief objects of the invention are to provide an improved method and improved apparatus for skiving the surface of a flexible structure; to provide for accuracy of profile and depth in the recess formed in the said structure; to effect economies of time and labor; and to provide for the safety of the operator. Other objects will be manifest.

Of the accompanying drawings:

Figure 3 is a front elevation thereof;

Figure 4 is a detail view of a portion of the structure shown in Figure 1 as it appears at the beginning of a skiving operation;

Figure 5 is a plan view of the apparatus as it appears at the completion of a skiving operation;

Figure 6 is a section, on a larger scale, on the line 6—6 of Figure 4;

Figure 7 is a view of the elements shown in Figure 6, at a succeeding phase of operation;

Figure 8 is a full size, fragmentary, vertical section through the skiving apparatus, and the work therein, during a skiving operation;

Figure 9 is a fragmentary plan view of the work showing the concavity formed therein by the improved skiving apparatus, and a perforation within said cavity;

Figure 10 is a section on the line 10—10 of Figure 9; and

Figure 11 is a view of the structure shown in Figure 10 as it appears after a valve stem has been mounted thereon.

Figure 1:
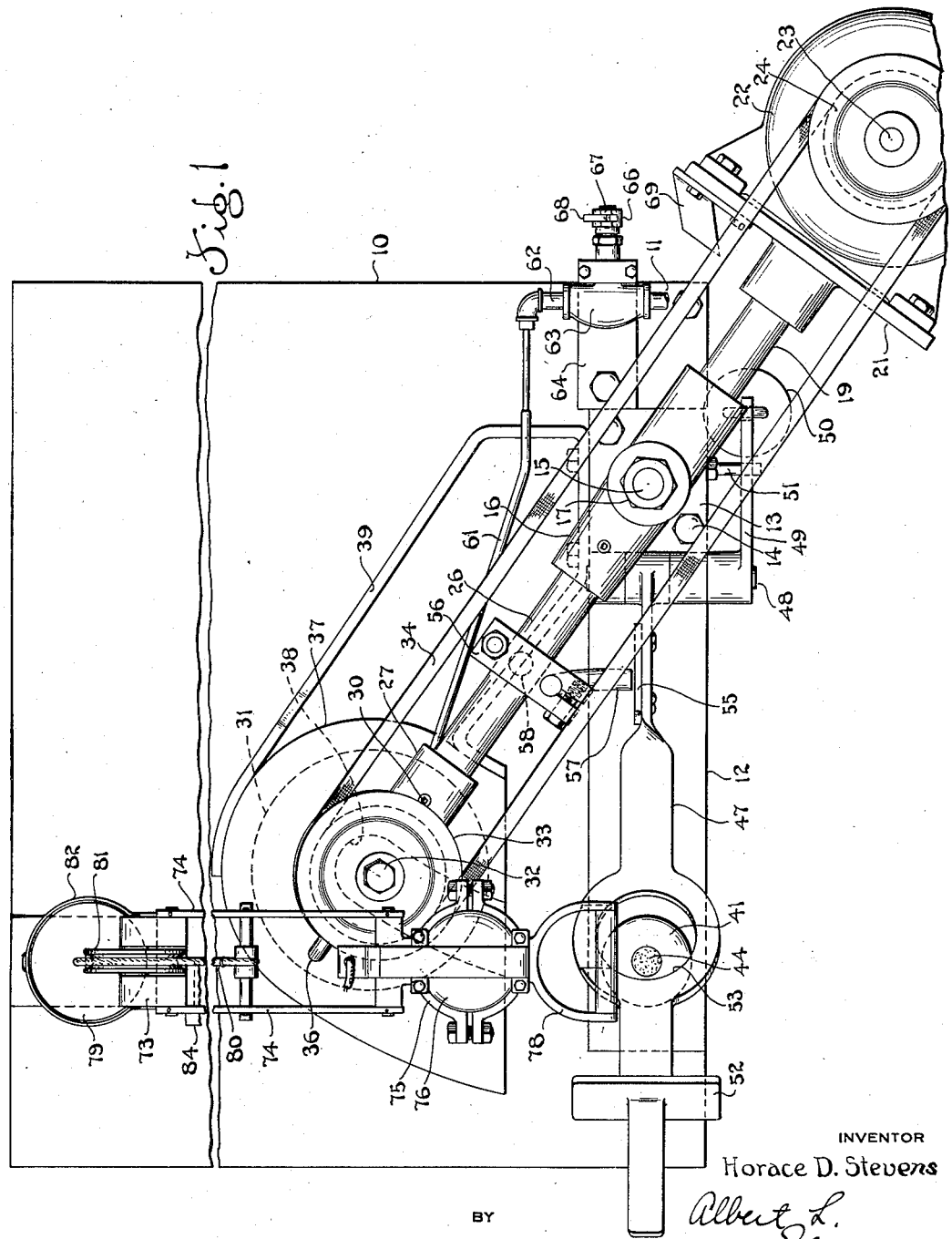
Figure 1 is a plan view of apparatus embodying and adapted to carry out the invention, in its preferred form, in inoperative position.

Referring to the drawings, 10 is a suitable table or elevated structure upon which the improved skiving apparatus and a perforating device are mounted in determinate relative position as subsequently will be explained. Mounted upon the top of the table 10, at one margin thereof, is a base block 11. Mounted upon the latter is a forwardly extending, overhanging arm 12, and superposed upon the end portion of the said arm, over the said base block 11, is a bracket 13, the latter and the arm 12 being secured to the base block by a plurality of bolts 14, 14. Mounted in the bracket 13 is a vertical, upwardly extending spindle 15 upon which is swiveled a hub-bracket 16, there being a pair of lock-nuts 17 on the upper end of the spindle for retaining said hub-bracket on the spindle.

Figure 2:
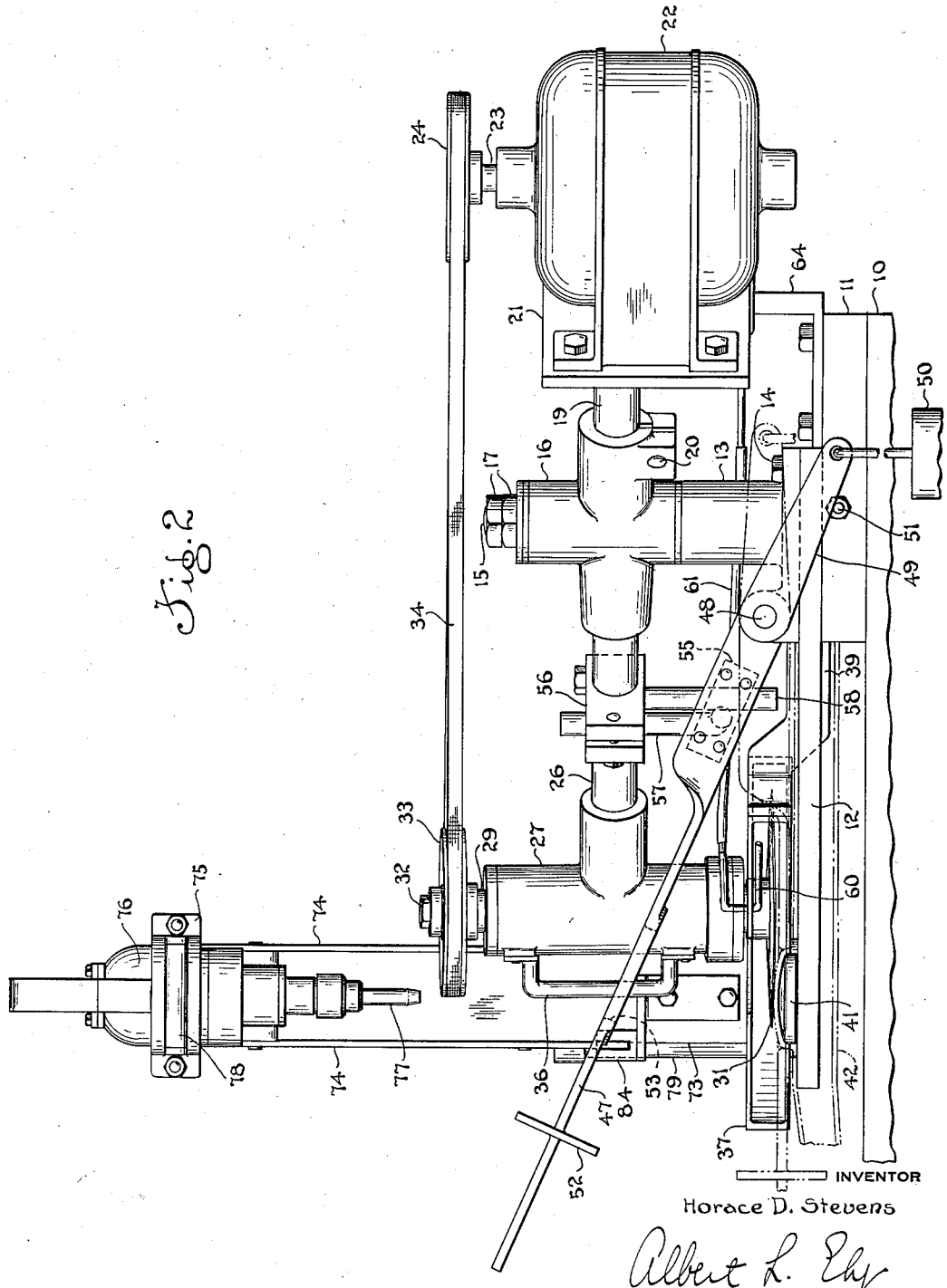
Figure 2 is a side elevation thereof.

Said hub-bracket 16 carries a radially disposed arm 19 that is secured for longitudinal adjustment therein by means of a clamping screw 20, Figure 2. Mounted upon the free end of said arm 19 is a motor-bracket 21 to which is secured an electric motor 22, the rotor-shaft 23 of the latter being disposed vertically and having a grooved pulley 24 mounted upon its upper end. The arm 19 extends in a general rearward direction with relation to the apparatus.

The said hub-bracket 16 also carries a radially disposed arm 26 that extends generally forwardly and is in axial alignment with arm 19. Mounted upon the free end of arm 26 is a journal bracket 27 that carries suitable bearings, such as the bearing 28, Figure 8, for a shaft 29. The journal bracket 27 is angularly adjustable upon the end of arm 26 by means of set screw 30, and is so positioned thereon that the shaft 29 is disposed at an angle of a few degrees from the vertical, for a purpose presently to be explained. Secured to the lower end of shaft 29 by means of a nut 29a is a circular disc knife 31, said nut being threaded onto the lower end of a bolt 32 that extends axially of the shaft 29, the head of the bolt at the upper end of the shaft retaining a grooved pulley 33 thereon. The pulley 33 is connected to the motor pulley 24 by a suitable transmission belt 34. The relative length of the arms 19, 26 is such that the structure on one side of the hub bracket 16 substantially balances the structure on the other side thereof, whereby ease of operation and reduction of wear is effected. The longitudinal adjustability of arm 19 makes it possible to keep the belt 34 taut at all times.

The journal bracket 27 is provided with a hand-grip structure 36 which the operator may grasp to swing the cutter 31 in an arc about the spindle 15 as an axis, from the inoperative position shown in Figure 1, to the operative position shown in Figure 5. In its inoperative position the cutter 31 is confined within a sheet metal guard 37 that is formed in its top with an arcuate slot 38 to permit the cutter-support to carry the cutter thereinto. The guard 37 is supported by bracket-arms 39, 39 that are secured to a lateral face of the fixed end portion of overhanging arm 12.

Movement of the cutter knife 31 from the position shown in Figure 1 to the position shown in Figure 5 carries said knife over a circular button 41 that is threaded through the free end portion of arm 12. Said button projects above the upper face of said arm 12, and has a convex top surface that provides a seat for the work, the latter being shown as an unvulcanized rubber tube 42. The button 41 is so positioned that a portion of the surface of the work thereon projects into the path of movement of the knife 31. The button 41 is formed with an axial bore 43, that is counterbored at its upper end to receive a fibre insert 44, the top of the latter being flush with the top of the button and similarly convex. The angular position of the journal bracket 27 on arm 26 is such that the leading edge of knife 31 is tilted slightly downwardly, as is best shown in Figure 8, when the cutting structure is moving from inoperative to operative position, thereby reducing the friction between the knife and the work during the cutting operation. The arrangement is such that the knife 31 skives or pares a layer of material, shown at 45, Figure 8, from the surface of the work, the contour of said layer being circular because of the fact that the button 41 is circular. The thickness of the layer pared from the tube may be varied by altering the height of the button 41, which is accomplished simply by rotating the button, thereby varying the extent to which the work extends into the path of the knife. The contour of the layer 45 removed from the work may be altered by the provision of buttons 41 of different shapes.

For retaining the work firmly upon the button 41 during the cutting operation, there is provided a locking bar 47 that is mounted between a pair of ears formed on bracket 13 and secured to a pivot pin 48 journaled in said ears. One end of said pivot pin projects laterally from said ears and carries a rearwardly extending lever arm 49 to the free end of which is suspended a counterweight 50, the latter normally holding said lever arm against a stop-pin 51, and thus supporting the locking bar in the inoperative, upwardly-tilted position shown in Figures 1, 2 and 3. The free end portion of the locking bar constitutes a hand grip that may be grasped to lower the bar to operative position, and there is a relatively large guard-flange 52 for said hand-grip portion. Rearwardly of the guard-flange 52 the locking bar is substantially widened and formed with a circular aperture 53. When the locking bar is in its lowered, operative position, the button 41 projects through the aperture 53 and is concentric therewith, the aperture being sufficiently larger in diameter than the button to accommodate the work 42 upon the button, whereby the said work is firmly held in place, as is most clearly shown in Figure 8. The locking bar 47 is manually held in its operative position while the cutter 31 is manually swung to operative position, the arrangement being such as to require the use of both hands by the operator, thus rendering it impossible for either hand to be in a dangerous position during a skiving operation.

As an added safety factor, means is provided for making it impossible to swing the cutter 31 out from under its guard 37 while the locking bar 48 is in its raised, inoperative position, and to this end an abutment plate 55 is secured to that side of the locking bar that faces the cutter structure in the inoperative position of the latter. Adjustably clamped upon arm 26 of the cutter structure is a block 56 that carries angular stop-pin 57 that is vertically adjustable therein. As is clearly shown in Figures 1 and 3, the free end of stop-pin 57 is positioned beside the abutment plate 55 in the inoperative position of the locking bar and cutter structure, thus preventing swinging movement of the latter.

When the locking bar is in lowered, operative position, as indicated in broken lines in Figure 2, the abutment plate 55 is below stop-pin 57, so that the latter may pass over said abutment plate and the cutter structure may be swung to the operative position shown in Figure 5. The block 56 also carries a straight stop-pin 58 that extends downwardly to a point substantially below the angular portion of stop-pin 57. The arrangement is such that stop-pin 58 will engage abutment plate 55 and thereby limit the swinging movement of the cutter structure, as shown in Figure 5, so that said structure may not be swung farther than is necessary for the skiving of the work.

To facilitate the skiving of the work, the cutter 31 is lubricated with water, and to this end a nozzle 60 having a multiplicity of perforations therein is mounted upon the lower end portion of the journal bearing 27 in position to direct a spray of water onto said cutter. The nozzle 60 is connected by a flexible conduit or hose 61 to the outlet pipe 62 of a valve 63, the latter being mounted upon an angular bracket 64 that is secured to base-block 11 and has connection, through inlet pipe 65, with a source of water under pressure (not shown). The valve 63 is of a well-known type, and is opened and closed by angular movement of a member 66, best shown in Figures 6 and 7, the opening of the valve being opposed by yielding means that restores the valve to closed position when opening pressure is removed. The said member 66 is formed with an upwardly projecting ear 67 upon which is pivotally mounted a dog 68, one end of the latter being heavier than the other so as normally to assume a downwardly inclined position, as shown in full lines in Figure 6, and thus to rest against the side of said member 66. The other end of said dog 68 extends upwardly into the path of a cam 69 that is mounted upon the motor-bracket 21.

The arrangement is such that when the cutting structure is swung from the inoperative position shown in Figure 1 to the operative position shown in Figure 5, the cam 69 engages the dog 68 when the apparatus is in the position shown in Figures 4 and 6, in which position the knife 31 is just engaging the work. The moving cam moves said dog and its supporting member 66 angularly to the position shown in full lines in Figure 7, in which position of the parts the valve is open and water is sprayed upon the knife 31 to facilitate the skiving operation. By the time the cutting structure reaches the extreme position shown in Figure 5, at the completion of the skiving operation, the cam 69 has passed out of engagement with dog 68 and the valve parts have restored themselves to the inoperative positions shown in broken lines in Figure 7. Thereafter when the cutting structure is restored to the inoperative position shown in Figure 1, the cam 69 moves backwardly past dog 68, the latter turning upon its pivot to the position shown in broken lines in Figure 6 to permit such movement of the cam without affecting the condition of the valve 63.

The operation of the apparatus is extremely simple, requiring only that the work to be skived be placed over the button 41, the locking bar to be lowered to draw the work tightly over the button, as shown in Figure 8, and the manual swinging of the cutting structure from the position shown in Figure 1 to the position shown in Figure 5, whereby a circular layer or disc of material 45 is removed from the surface of the work. The motor 22 is constantly driven and the lubricating spray is automatically applied to the cutter 31 at the beginning of the skiving operation and discontinued as soon as the operation is completed. The cutting structure is then returned to its inoperative position shown in Figure 1. After the work is removed from the apparatus and restored to normal flat condition, there will be a symmetrical recess or concavity 71, in the wall thereof at the place where the layer 45 has been removed, as is most clearly shown in Figures 9 and 10.

In the manufacture of inner tubes for pneumatic tires, it is necessary that an aperture be formed in the tube wall concentrically with relation to the recess 71 that receives the base flange of a valve stem, and to this end a perforating device is provided for forming said aperture before the tube is removed from the skiving apparatus.

Said perforating device comprises an upstanding bracket 73 that is mounted upon the table 10 at one side of the skiving device. Pivotally mounted at an intermediate region of bracket 73 are two pairs of parallel arms 74, 74 that pivotally support a bracket 75 at their outer ends, the arrangement constituting a parallel motion mechanism that retains the bracket 75 in determinate angular position in all positions of the arms 74. Clamped in the bracket 75 is an electrically driven device 76 carrying a downwardly extending rotary perforating tool 77. The bracket 75 includes a hand grip 78 for manually raising and lowering the tool-rotating device 76. The device 76 normally is retained in elevated, inoperative position, as is most clearly shown in Figure 3, by means of a counterweight 79 that is suspended from a cable 80 that is trained over a sheave 81 journaled in the top of bracket 73, the other end of said cable being connected to one pair of the arms 74. A guide structure 82 for the counterweight 79 is mounted on bracket 73 and serves to prevent swaying of said counterweight. The perforating device is so positioned upon the table 10 that when the cutting tool 77 is manually lowered to operative position it is axially aligned with the work-supporting button 41 so as to cut through the work thereon, against the underlying fibre insert 44 in said button, thus forming an aperture 83 (Figures 9 and 10) in the work coaxially of the recess 71 therein. A slotted guide 84 is mounted on bracket 73 and adapted to receive one of the lower pair of arms 74, in the operative position of the device, to impart lateral rigidity thereto and thus to assure accurate positioning of the aperture 83. A reservoir 85 for water may be adjustably mounted upon bracket 75 in position to apply water-lubricant to the tool 77 to facilitate the perforating operation.

A rubber tube skived and perforated as described is ready for the application of a valve stem thereto. In Figure 11 is shown a valve stem 87 made entirely of rubber and integrally formed with a circular rubber base flange 87a. The latter may be shaped complemental to the recess 71 in the tube, but this is not essential since said flange easily may be deformed so as to conform to the curvature of said recess. The valve-base flange 87a is cemented into the recess 71, concentrically thereof so that the axial passage 88 of the valve stem is in registry with aperture 83 in the tube. Said base flange and adjacent area of the tube is then overlaid with thin layers 89, 89 of unvulcanized rubber, with their margins in offset or stepped relation as shown. After the ends of the tube are joined to form an annular structure, the tube is vulcanized under heat and internal pressure in the usual manner, with the result that the rubber layers 89 coalesce with the tube 42 and both adhesively unite with the valve stem flange 87a, whereby the valve stem becomes an integral part of the tube structure. The feature of mounting the valve stem flange in a recess of similar shape and size in the tube obviates the forming of an unnecessary, greatly thickened region about the base of the valve stem. It will be understood that instead of the all-rubber valve stem shown, there may be provided a metal valve stem having a rubber base flange vulcanized thereon.

The improved method of skiving and the improved apparatus described accomplish economies of time and labor, effect an improved product, and achieve the other advantages set out in the foregoing statement of objects.

Modification may be resorted to without departing from the spirit of the invention or the scope of the appended claims, which are not limited wholly to the specific construction shown or exact procedure described.

What is claimed is:

1. In skiving apparatus, the combination of a rotary cutter, a pivotal support therefor adapted to be manually moved to carry the cutter in a determinate course, a support for the work including a button adapted to present a local region of the work in the path of the cutter, and a pivoted, manually operable locking bar formed with an aperture through which said button extends, in the operative position of the bar, for holding the work firmly upon the button.

2. In skiving apparatus, the combination of a rotary cutter, a manually operable pivotal support therefor adapted to move said cutter in a determinate course, means for deforming a local region of a sheet of material and presenting a portion thereof in the course of said cutter, and means for lubricating said cutter while it is in a determinate local region of its course.

3. In skiving apparatus, the combination of a rotary cutter, means for moving the same in a determinate course, a work support adapted to present a local region of the work in the path of the cutter, a locking bar for retaining the work on the support, said locking bar having an operative position and an inoperative position, and means for preventing movement of the cutter in its course when the locking bar is in inoperative position.

4. In skiving apparatus, the combination of a rotary cutter, means for moving the same in a determinate course, a work support adapted to present a local region of the work in the path of the cutter, and a locking bar for retaining the work on said support, said locking bar having an operative and an inoperative position, in the latter of which it obstructs movement of the cutter in its course.

5. In skiving apparatus, the combination of a rotary cutter, means for moving the same in a determinate course, a work support adapted to present a local region of the work in the path of the cutter, and a locking bar for engaging and retaining the work on said support, said locking bar having an inoperative and an operative position, in the latter of which it limits the course of movement of the cutter.

6. In skiving apparatus, the combination of a rotary cutter, a pivotal support therefor adapted to be manually oscillated to move the cutter in a determinate course, a work support adapted to present a local region of the work in the path of the cutter, a locking bar for retaining the work on said support, said locking bar having an operative and an inoperative position, and a pair of stop pins mounted upon the cutter-support, said pins being so constructed and arranged as to engage said locking bar, to limit the movement of the cutter support, alternatively in the operative and inoperative positions of said locking bar.

7. In skiving apparatus, the combination of a rotary cutter, means for moving the same back and forth in a determinate course, means for presenting material to be skived in the path of said cutter, and means for lubricating the cutter while moving in one direction only of its course.

8. In skiving apparatus, the combination of a rotary cutter, means for moving the same back and forth in a determinate course, means for presenting material to be skived in the path of said cutter, and means for lubricating said cutter while in a determinate local region of its course, and while moving in one direction only through said region.

HORACE D. STEVENS.